United States Patent [19]
Monberg et al.

[11] Patent Number: 5,897,798
[45] Date of Patent: Apr. 27, 1999

[54] LASER TEXTURING APPARATUS EMPLOYING A ROTATING MIRROR

[75] Inventors: Edmund M. Monberg, Palo Alto; Bruce M. Harper, San Jose, both of Calif.

[73] Assignee: HMT Technology Corporation, Fremont, Calif.

[21] Appl. No.: 08/869,068

[22] Filed: Jun. 4, 1997

[51] Int. Cl.⁶ .................................................. B23K 26/08
[52] U.S. Cl. .............................. 219/121.68; 219/121.69; 219/121.74; 219/121.79
[58] Field of Search ......................... 219/121.6, 121.68, 219/121.69, 121.74, 121.78, 121.79, 121.75, 121.8, 121.82, 121.77; 427/555, 596

[56] References Cited

U.S. PATENT DOCUMENTS

| | | | |
|---|---|---|---|
| 3,594,532 | 7/1971 | Lunau et al. | 219/121.79 X |
| 4,367,017 | 1/1983 | Jimbou et al. | 219/121.79 X |
| 4,475,182 | 10/1984 | Hosaka . | |
| 4,563,565 | 1/1986 | Kampfer et al. | 219/121.69 |
| 5,089,683 | 2/1992 | Stephenson et al. | 219/121.78 |
| 5,108,781 | 4/1992 | Ranjan et al. . | |
| 5,231,262 | 7/1993 | Matsumura et al. | 219/121.77 X |
| 5,406,048 | 4/1995 | Yamazaki et al. | 219/121.78 |
| 5,420,840 | 5/1995 | Bec . | |
| 5,528,922 | 6/1996 | Baumgart et al. | 73/1 J |
| 5,550,696 | 8/1996 | Nguyen . | |
| 5,567,484 | 10/1996 | Baumgart et al. . | |
| 5,595,768 | 1/1997 | Treves et al. | 425/174.4 |
| 5,658,475 | 8/1997 | Barenboim et al. | 219/121.77 |
| 5,699,160 | 12/1997 | Barenboim et al. | 356/359 |
| 5,714,207 | 2/1998 | Kuo | 427/555 |
| 5,768,076 | 6/1998 | Baumgart et al. | 360/135 |

FOREIGN PATENT DOCUMENTS

| | | | |
|---|---|---|---|
| 7-65359 | 3/1995 | Japan | 219/121.68 |
| 8-224676 | 9/1996 | Japan | 219/121.68 |

*Primary Examiner*—Gregory L. Mills
*Attorney, Agent, or Firm*—LeeAnn Gorthey

[57] ABSTRACT

An apparatus and method for laser texturing of magnetic recording media are described. The apparatus includes an optical assembly, containing first and second mirrors, which are rotated and optionally shifted during a texturing operation. This optical assembly directs a pulsed laser beam onto a series of focused spots on the surface of a magnetic disk, creating a desired pattern of texturing while maintaining a constant focus of the beam at the surface of the disk.

12 Claims, 2 Drawing Sheets

LASER TEXTURING APPARATUS EMPLOYING A ROTATING MIRROR

FIELD OF THE INVENTION

The present invention relates to laser texturing of magnetic recording media, and more particularly to a method and apparatus for creating a desired pattern of texturing while maintaining a constant focus of the laser beam at the surface of the substrate being textured.

REFERENCES

Nguyen, T. A., U.S. Pat. No. 5,550,696 (1996).
Ranjan, R. Y. et al., U.S. Pat. No. 5,108,781 (1992).

BACKGROUND OF THE INVENTION

Over the past several years, a significant increase in recording density in thin-film media magnetic recording disks has been achieved, and there is a continuing effort to increase recording density further. A number of magnetic properties in a thin-film disk are important to achieving high recording density. These include high coercivity, high remanence, and low flying height, that is, a close proximity of the read/write heads to the disk surface. Such proximity decreases overlap of voltage signals in adjacent magnetic domains in the disk, thus permitting an increase in recording density and optimum read-write performance.

To reduce flying height, and to improve wear resistance, it is desirable for the surface of the disk to be as smooth as possible. However, prolonged contact of a read-write head with a very smooth disk surface, i.e. when the head is not in use, can lead to the problem of "stiction", wherein the two closely matching surfaces stick to each other, causing possible damage during start/stop cycles. Manufacture of such disks thus typically includes a texturing step, to create a roughened substrate surface, characterized by submicron surface irregularities. The roughened surface reduces stiction between the disk and head by reducing surface contact between the two, particularly for start/stop cycles. Such texturing is often carried out only on a nondata region near the inner opening of the disk, where the read/write head is "parked" when the disk is not operating.

Such texturing can lead to an undesirable increase in flying height if there is too much variation in the surface irregularities created. The best (lowest) flying head distances which have been achieved with plated metal-substrate disks polished by sanding or abrasion, as described above, is about 6 microinches (mils). Laser texturing of such magnetic media, in which textured spots on the surface are produced by controlled melting and solidifying at closely spaced locations on the plated alloy, has been reported to produce flying head distances in the range of one microinch or less (Ranjan), a clear improvement over abrasion-based methods.

For maximum uniformity in laser texturing, however, it is important to maintain a constant focus of the laser beam at the surface of the disk as the beam is moved from one spot on the disk to another. Certain variables exist in previously described methods which could lead to variations in the path length between the laser source and the disk surface, resulting in variable focus at the disk surface, and a resulting lack of uniformity in the size and depth of the textured sites. For example, in texturing a disk, it is generally desirable to produce a pattern of textured spots over a central surface region of the disk. This is achieved in the reported methods by rotating the disk on a spindle, in conjunction with radial stepping of the laser or the disk. If any oscillatory motion occurs during rotation of the disk, or if the precise distance between the laser and disk surface is not maintained during radial stepping, variations in depth of texturing greater than the order of a microinch are likely to result.

Thus, it is desirable to provide a laser texturing apparatus and method which allows precise focus of the laser beam to be maintained at the disk surface as the beam is directed to various points on the surface.

SUMMARY OF THE INVENTION

The present invention includes, in one aspect, an apparatus for laser texturing an annular surface region of a magnetic disk substrate, of the type having an annular planar surface extending between a central opening and an outer edge. The apparatus includes a laser for generating a pulsed laser beam having a given frequency and a pulsed energy effective to phototexture the surface of such a substrate, when the laser beam is focused onto the substrate surface, and a substrate support adapted to hold the substrate at a selected position. Preferably the substrate is held such that its planar surface is normal to the laser beam, and the beam is substantially coincident with a central axis, defined by the central opening, of the disk.

The apparatus further includes an optical assembly, including first and second mirrors, effective to direct the laser beam onto a focused spot on the surface of the substrate, adjacent its central opening, with the substrate held in the support. Rotating means are provided for rotating the optical assembly about the laser-beam axis, effective to generate a series of phototextured spots about the laser-beam axis on the substrate surface.

Shifting means are also provided for shifting the relative position of at least one mirror of the optical assembly with respect to the disk substrate. Such shifting is effective to change the distance of such a spot from the substrate's central opening.

The optical assembly includes first and second mirrors positioned to deflect the laser beam along an optical path that is substantially parallel to, but radially offset from, the axis of the unreflected portion of the laser beam. A focusing lens is interposed in said optical path between the laser and the surface of the substrate. In one embodiment, the lens is interposed between the laser and the first mirror of the optical assembly.

The shifting means, above, is effective to maintain a constant-length path of the laser beam between the lens and the surface of the substrate.

The apparatus preferably includes control means effective to control the pulse frequency of the laser, and the rotating and shifting means, to produce a desired pattern and density of textured spots in a selected annular region of a support-held substrate.

In one embodiment, the apparatus is adapted for texturing a substrate surface disposed toward the laser. In this embodiment, the first and second mirrors have confronting planar reflecting surfaces that are disposed plane-parallel with respect to each other, and the second mirror acts to reflect the beam portion reflected from the first mirror in the same direction as the unreflected beam portion. The shifting means is effective to shift the position of the first mirror with respect to the second mirror along the axis of the unreflected portion of the laser beam.

In another embodiment, the apparatus is adapted for texturing a substrate surface opposite to the surface facing the laser. In this embodiment, the first and second mirrors have planar reflecting surfaces that are orthogonally disposed with respect to one anther, and the second mirror acts to reflect the beam portion reflected from the first mirror in the direction opposite that of the unreflected beam portion. In one embodiment, the second mirror is held at a fixed distance from the first, and the shifting means is effective to shift the position of the mirror assembly along an axis that is normal to that of the unreflected portion of the laser beam. In another embodiment, the second mirror is movable with respect to the first, such that the shifting means is effective to shift the second mirror along this same axis.

The invention also includes an apparatus for simultaneously texturing opposite sides of a disk substrate. This apparatus includes a separate optical assembly, rotating means, and shifting means, of the type set out above, for each side of a two-sided substrate, and a beam splitter for directing a beam from a laser to each of the two optical assemblies.

In another aspect, the invention provides a method for laser texturing an annular surface region of a magnetic disk substrate, of the type having an annular planar surface extending between a central opening and an outer edge. According to the method, a substrate is held in a substrate support at a selected position, and a pulsed laser beam, having a given frequency and a pulsed energy effective to phototexture the surface of the substrate, is directed towards an optical assembly, including first and second mirrors, which is effective to direct the beam onto a focused spot on the surface of the substrate. The optical assembly is rotated about the axis of the beam, in a manner effective to generate a series of such spots on the surface of said substrate. In addition, the relative position of the disk substrate and at least one mirror of the optical assembly is shifted to change the distance of the phototextured spot from the substrate's central opening. The method preferably includes controlling the rotating and shifting means in response to the pulse frequency of the laser, to produce a desired density of textured spots in a selected annular region of the support-held substrate.

These and other objects and features of the invention will become more fully apparent when the following detailed description of the invention is read in conjunction with the accompanying drawings.

DETAILED DESCRIPTION OF THE INVENTION

I. Definitions

The terms below have the following meanings unless indicated otherwise.

"Phototexturing" refers to the production of a textured topography on a magnetic disk surface, typically within an alloy coating of the disk, by controlled, laser-induced melting and subsequent resolidifying of the coating at spots upon which the laser is focused. Such phototexturing typically forms a small "crater" at each spot. Although the topography of the surface is altered, no material is removed from the disk during phototexturing.

A "focused" spot on a disk onto which a laser is directed, in the present apparatus and method, typically includes a small, controlled area, rather than a single point, of the disk, upon which the laser beam impinges.

II. Laser Texturing Apparatus

Figure 1:
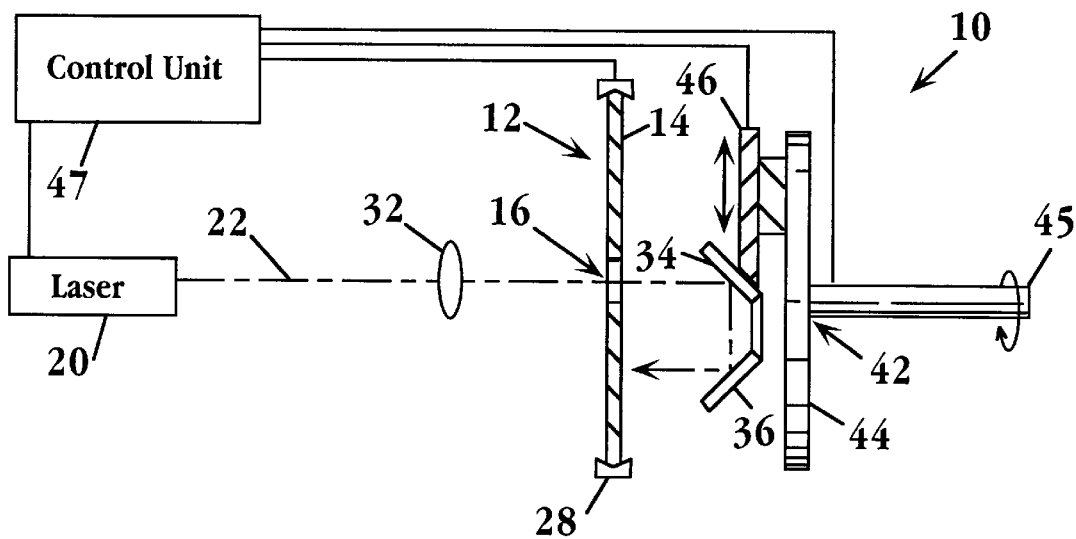
FIG. 1 shows a laser texturing apparatus in accordance with one embodiment of the invention.

FIG. 1 illustrates a laser texturing apparatus 10 constructed in accordance with one embodiment of the invention. The apparatus is useful for precise texturing of the surface of a disk substrate, such as that shown at 12. Such disk substrates suitable for the recording, storage and reading of magnetic data may be prepared, according to well known methods, by sputtering a thin magnetic film, consisting of a chromium underlayer, a cobalt-based magnetic thin film, and a protective, lubricating carbon overcoat, on a metal substrate, typically an aluminum substrate. Prior to sputtering, the substrate is plated with an alloy, such as nickel/phosphorus, to achieve a requisite surface hardness. The plated disk is polished to remove surface nodules which form during the plating process, and is then textured, as described herein.

The substrate has an annular planar surface 14, and a central opening 16, through which passes the central axis of the disk. The surface region to be textured is typically adjacent the central opening, as shown at 18, as this is the region of the disk, known as the "landing zone", on which the read/write head is "parked" when the disk is not in use.

A laser 20, such as a pulsed mode Nd-YAG laser, is supported adjacent the disk so that a pulsed beam, shown at 22, having a given frequency and energy, may be directed towards the disk, so as to phototexture the surface of the disk at a spot upon which the beam is focused. In the embodiment shown in FIG. 1, the pulsed beam is directed through central opening 16 of the disk, and is substantially coincident with the central axis of the disk. The beam is typically maintained at a constant output energy throughout a texturing operation. Such laser texturing of magnetic disks, and the typical topography of the "spots" produced, is described, for example, in Ranjan and Nguyen.

For uniform texturing to occur, a consistent focus of the beam at the surface must be maintained as the laser is directed to different points on the disk surface. This consistent focus is accomplished in accordance with the present invention by maintaining a constant light path between the focusing lens and the disk surface, as described below.

The disk is held, during the texturing operation, in a substrate support, which holds the disk at a selected position normal to the incident direction of the laser beam, such that the beam is substantially coaxial with the central axis, defined by the central opening, of the disk. The support may include holders as shown at 28 which engage a number of points on the circumferential edge of the disk and maintain its position. Such a support may also be a simple clamping structure, or a Bernoulli-type holder such as described in copending application "Laser Texturing Apparatus with Bernoulli-Type Holder," which is hereby incorporated by reference.

The apparatus also includes, as shown, an optical assembly which directs the laser beam to a focused spot on the disk surface. The assembly includes a lens 32 for focusing the beam, and a mirror assembly for receiving and reflecting the focused beam to a desired spot on the surface of the substrate. The portion of the beam resulting from such reflection travels along an axis that is substantially parallel to, but radially offset from, the incident beam.

In the embodiment shown in FIG. 1, the mirror assembly consists of mirrors 34 and 36, which have planar reflecting surfaces disposed orthogonally to each other, and at a 45° angle to the incident beam, in a rigid and fixed configuration. The lens is interposed between the laser and first mirror 34. As shown, the mirror assembly serves to direct the focused laser beam to a spot on the surface of the disk facing away from the beam source.

The mirror assembly is mounted on or operably attached to a rotatable structure 42, also described as rotating means, such as plate 44 driven by axle 45. Other conventional rotating means, such as a worm driving the outer edge of a gear in place of plate 44, could also be used. During a texturing operation, the axle or equivalent structure rotates the mirror assembly around the axis defined by the laser beam and the central axis of the disk. The rotating means is thus effective to change the selected angular offset of the reflected beam, and the resulting phototextured spot, from a given radius of the disk surface. In the absence of any additional adjustment, such rotating results in a circular pattern of spots produced by the pulsed laser beam on the surface of the disk, about the laser-beam axis.

Also included in the apparatus is a shifting mechanism, such as slider 46, mounted on the rotatable structure and engaging the mirror assembly. In the embodiment shown in FIG. 1, the slider, also referred to herein as shifting means, moves the mirror assembly along an axis normal to the axis of the incident laser beam. Thus, during a texturing operation, the shifting means is effective to change the radial distance of the site of focus of the laser beam, as it impinges on surface 14, from the central opening of the disk.

In additional embodiments, one of the mirrors, such as first mirror 34, may be held in a fixed, i.e., rotating but non-shifting, position, while the other mirror is attached to a shifting means effective to move it along an axis normal to the axis of the incident laser beam. The lens, shown in FIG. 1 between the laser and disk substrate, could also be fixed relative to the second mirror at a position in the optical path between this mirror and the substrate surface, and still provide the benefits of the invention.

The shifting means could also act on other components of the rotating means, e.g. axle 45, and produce the same effect. The relative position of the disk and optical assembly may also be shifted by moving the disk in a direction normal to the incident laser beam, rather than by shifting the optical assembly. Thus, the shifting means may include structure effective to move the disk in this manner. Preferably, however, the laser and disk substrate are maintained in fixed positions during texturing, thus reducing the possibility of introducing variability into the light path length.

Figure 2:
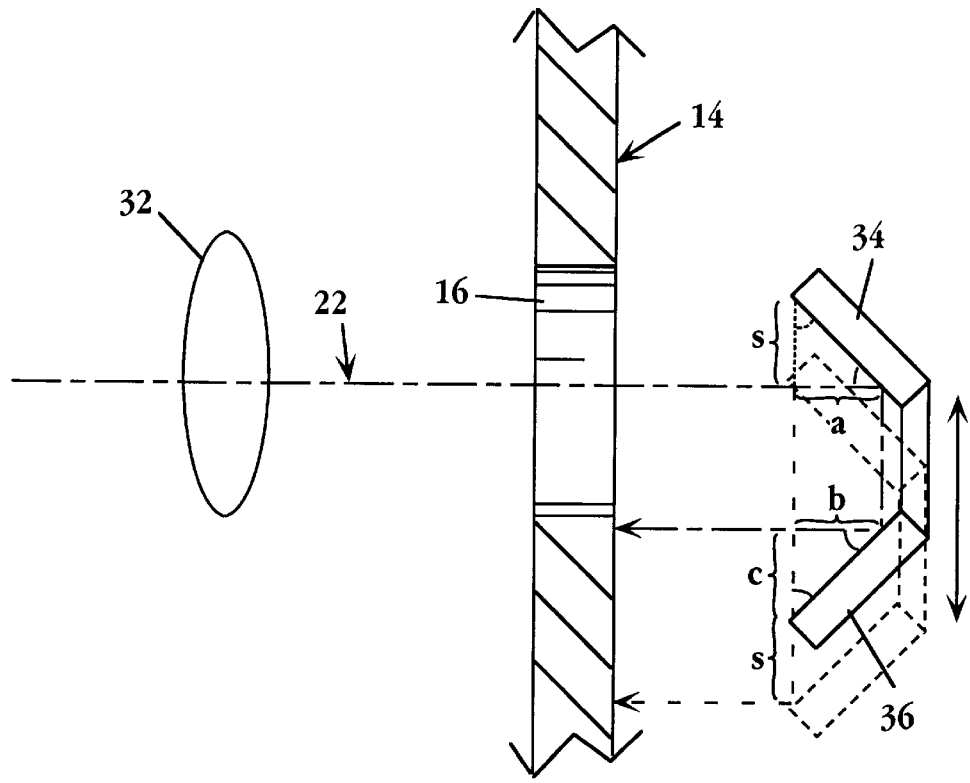
FIG. 2 shows a detail view of a shifting of the mirror assembly of FIG. 1, showing that the light path from lens to substrate remains constant upon shifting.

FIG. 2 shows a detail view of the optical assembly in one embodiment, illustrating the path taken by the laser beam in a first configuration, where the position of the mirrors is shown by solid lines, and a second configuration, where the position of the mirrors is shown by dotted lines, assumed by shifting of the mirror assembly as described above. The second configuration directs the laser beam to a different radial location on the disk surface, as described above. It will be appreciated from the figure, on the basis of simple geometric principles and the fact that all incident and reflected angles are 45°, that the distance traversed by the laser beam, from the lens to the disk surface, is the same in both configurations. (For example, it can be seen that the two paths must be equal if the total length of horizontal segments a and b is equal to the total length of vertical segments c and s, where s is the distance the mirror has shifted. The length a is equal to the length s because they are subtended by two equal angles within a triangle, as shown, and the same is true for segments b and c.) Thus, the shifting means is effective to maintain a constant-length path of the laser beam between the fixed lens and the surface of the substrate, as the beam is directed to various points on the surface.

The relative speed of rotation and shifting of the mirror assembly, together with the pulse frequency of the laser, determine the pattern of spots produced by the laser beam impinging on and phototexturing spots on the surface of disk 12. A preferred embodiment therefore includes control means, such as control unit 47 shown schematically in FIG. 1, to enable the shifting and rotating mechanisms to be controlled in accordance with the pulse frequency, that is, the frequency of firing, of the laser. The control unit is operably connected to the laser, the rotating means, e.g. axle 45, and the shifting means, e.g. slider 46. Thus, a desired pattern of texturing may be produced by adjusting, according to procedures known in the art (see e.g. Nguyen), the pulse frequency of the laser and the degree of shifting and/or rotation that occurs with each firing. In the event that a shifting mechanism is also provided for the disk holder, such may also operably attached to the control unit, as shown.

Figure 3:
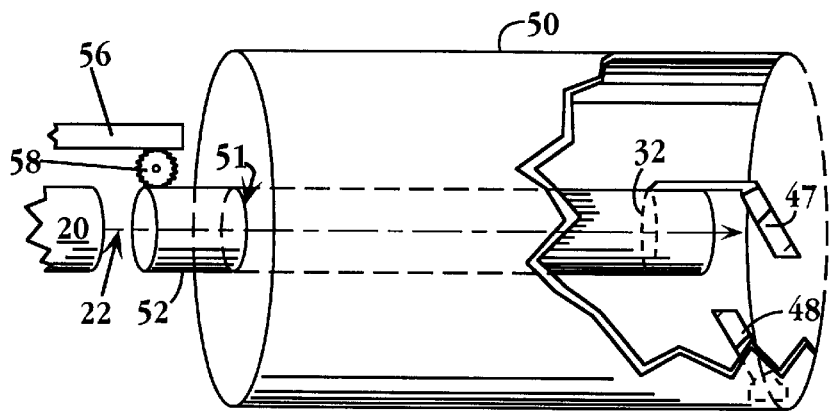
FIG. 3 shows a perspective view of a laser texturing apparatus in accordance with another embodiment of the invention.
Figure 4:
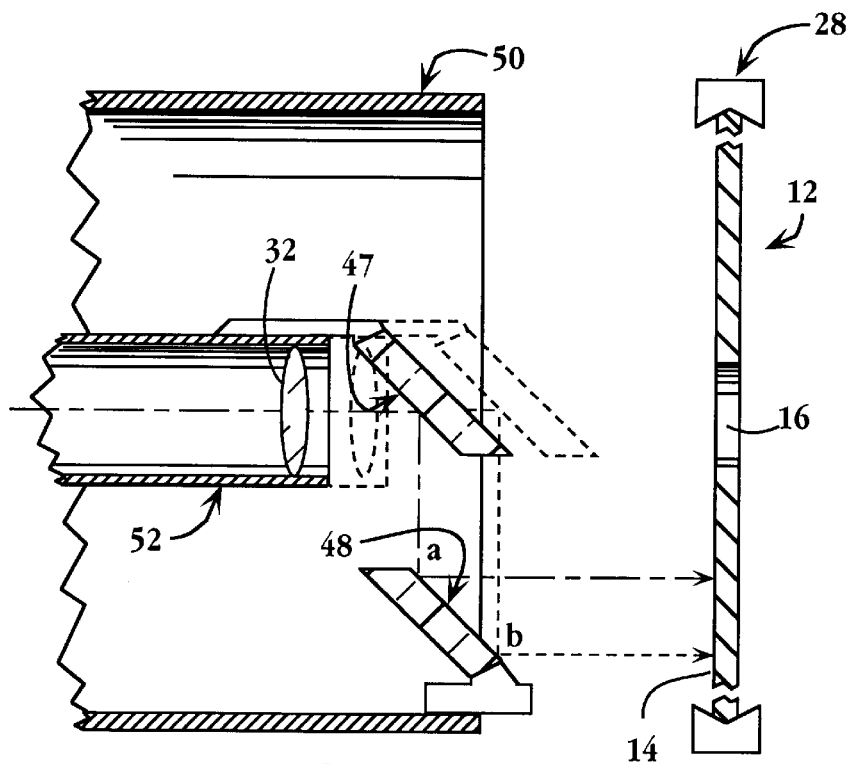
FIG. 4 shows a detail view of the shifting of the inner tube and mirror of FIG. 3 with respect to the outer tube and mirror, showing that the light path from lens to substrate remains constant upon shifting.
Figure 5:
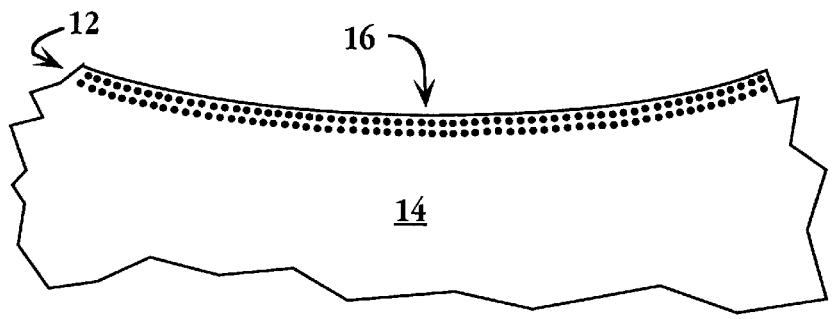
FIG. 5 illustrates a disk textured in accordance with the invention, wherein the landing zone, adjacent the central opening, is textured with a spiral or circular pattern of phototextured spots.

A further embodiment of the invention, where texturing occurs on the side of the disk facing the laser, is shown in FIGS. 3 and 4. The disk is held at a selected position normal to incident laser beam 22, such that the incident beam is substantially coincident with the central axis of the disk, as described above. This embodiment includes a mirror assembly consisting of first and second mirrors 47 and 48, which have confronting planar reflecting surfaces that are disposed plane-parallel with respect to each other, and at a 45° angle to the incident beam. The second mirror acts to reflect the beam portion reflected from the first mirror in the same direction as the unreflected portion of the laser beam, as shown in FIG. 4.

The rotating means in this embodiment is effective to rotate outer tube 50 and inner tube 52 in unison. Such rotating means may include, for example, a belt drive, a hollow rotor motor containing the outer tube, or bearings or gears which engage the outer surface of outer tube 50 and are connected to a rotating shaft. A central opening 51 in outer tube 50 engages inner tube 52 such that the two rotate in unison.

The inner and outer tubes include, respectively, first mirror 47, and second mirror 48, which rotate in unison with the tubes. The inner tube also includes fixed lens 32, through which a pulsed laser beam 22 from laser 20 is focused. As in the embodiment shown in FIG. 1, the lens could also be fixed relative to the second mirror at a position in the optical path between this mirror and the substrate surface, and still provide the benefits of the invention.

The shifting means in this embodiment is effective to shift the position of the first mirror with respect to the second mirror along the axis of the incident laser beam. This is accomplished, in the design shown, by moving inner tube 52 along this axis. Thus, inner tube 52 maintains a constant axis of rotation with outer tube 450 but may be shifted longitudinally along this axis. The shifting means may be a linear motion stage, as represented by 56, which engages the inner tube by means of a gear or bearings, such as shown at 58.

Such structure is able to accommodate rotation of the inner tube 52 with respect to the shifting means, e.g. a rotary bearing. Alternatively, the shifting means such as linear motion stage 56 may rotate in unison with the inner tube.

FIG. 4 shows a detail view of this embodiment, showing the path a taken by the laser beam to planar surface 14 of a disk 12 when the lens and first mirror are in a first position, shown by solid lines, and a second path b, taken when the first mirror is in a second position, shown by dotted lines, assumed by shifting of the inner tube along the linear motion stage. The two positions direct the laser beam to different radial locations on the disk surface, as shown. Again, it can be appreciated from the lengths of the beam path segments shown that the distance traversed by the laser beam, from the lens to the disk surface, is the same in both positions.

The positions of the mirrors and resulting light paths in FIG. 4 have been portrayed for maximum clarity. In an actual embodiment, second mirror 48 is preferably positioned as close as possible to inner tube 52, and the diameter of the inner tube preferably corresponds closely to, or is smaller than, that of central opening 16. Such a design allows the phototexturing beam to be directed to a region immediately adjacent to central opening 16.

Similar to the first embodiment, a control unit (not shown) is provided, operably connected to the laser, rotating means, and shifting means, e.g. the linear motion stage, to control shifting of the inner tube and rotation of both tubes, in response to the pulse frequency of the laser beam. Thus, a desired pattern of textured spots may be produced on the disk surface.

According to an important feature of the invention, the optical assembly described is effective, in both embodiments shown, to maintain a constant-length light path from the lens to the surface of the disk being textured, as the rotating and shifting means alter the position of the beam at the surface. Thus a constant and precise focus of the texturing laser beam is maintained at the surface of the disk. Assuming other parameters, such as beam energy, are adequately controlled, this provides uniform texturing of the targeted surface.

The apparatus of the invention, as described and shown in FIG. 1 or FIG. 3 above, is effective to texture one side of a supported disk substrate. In order to simultaneously texture both sides of a two-sided substrate, it would be a simple matter, based on the disclosure above, to provide a separate optical assembly, rotating means, and shifting means for each side of the substrate, and a beam splitter for directing a beam from the laser to each of the optical assemblies.

III. Laser Texturing Method

In a typical texturing operation, according to one aspect of the invention, a plated disk substrate to be textured is placed in a support or holder, as described above, such that its surface is orthogonal to an incident beam from laser 20. The disk may be clamped in place or otherwise held by physical supports, or it may be supported in a Bernoulli-type holder, as described in copending application "Laser Texturing Apparatus with Bernoulli-Type Holder", noted above. In accordance with the invention, a pulsed laser beam is then directed toward an optical assembly, containing first and second mirrors, which is effective to direct the beam to a desired location on the disk surface. The optical assembly is rotated about the beam axis, and, when desired, at least one mirror is shifted with respect to the disk substrate, to generate a desired pattern and density of phototextured spots on the surface.

The energy of the laser pulse used for phototexturing will depend on the nature of the surface being textured; for nickel-phosphorus coatings, a preferred range is 1 to 20 microjoules per pulse. The laser may be electronically controlled, according to known methods, to vary the pulse energy, pulse width and pulse frequency. If desired, a small known portion of the beam may be sampled by a power meter to allow correcting adjustments to be made if needed.

As noted above, a desired pattern and density of spots on the target surface may be obtained by incrementally rotating and/or shifting the optical assembly with each firing of the laser. These parameters may be programmed into a control unit, which controls the shifting and rotating mechanisms in response to the laser pulse frequency, according to known methods.

When texturing the landing zone of a magnetic disk, a pattern of concentric circles, or, more preferably, a tight spiral pattern, is generally applied to a central annular region of the disk. As an example, it may be desired to texture an annular region, having a width of about 0.15" (150 mils), or about 3.8 mm, surrounding the central opening of a 3.5" magnetic disk. The laser energy and focus is adjusted such that a typical phototextured spot will have a desired diameter. Diameters in the range of 5–30$\mu$ are typically formed by such phototexturing (Nguyen). For the present example, it is assumed that spots of 15–20$\mu$ diameter are desired, and that the spots are spaced a few microns apart, such that the displacement from the center of one spot, or the center of impingement of the laser beam, to the next such center, is about 25 $\mu$, or about 0.001" (1 mil). Thus, the number of spots around the inner circumference of the region to be textured will be about 2400, assuming a circumference of about 2.4". At a typical laser pulse frequency of, for example, 12 kHz, creating one such circle of spots takes 0.2 sec; thus the mirror assembly is rotated at 300 rpm.

To create a spiral pattern, a small radial shifting is incorporated with each firing of the laser via the shifting means. Such shifting is effective to create a radial pitch per revolution of, for example, one mil. In this case, approximately 150 revolutions produces the desired width of texturing. The circumference of each revolution increases slightly as a spiral pattern (or a pattern of concentric rings) is produced, and such increase is compensated for by gradually (or incrementally, for concentric rings) increasing the laser pulse frequency or the speed of rotation of the mirror assembly.

While the invention has been described with refer-ence to specific methods and embodiments, it will be appreciated that various modifications may be made without departing from the invention.

We claim:

1. An apparatus for laser texturing an annular surface region of a magnetic disk substrate, said substrate having an annular planar surface extending between a central opening and an outer edge, said apparatus comprising a laser for generating a pulsed laser beam having a given frequency and a pulsed energy effective to phototexture the surface of the substrate, when the laser beam is focused onto the substrate surface, a substrate support adapted to hold the substrate at a selected position, an optical assembly, comprising first and second mirrors, effective to direct the laser beam onto a focused spot on the surface of said substrate adjacent said central opening, with the substrate held in said support, wherein said mirrors have confronting planar reflecting surfaces that are disposed plane-parallel with respect to each other, positioned to deflect the laser beam along an optical path that is substantially parallel to, but radially offset from, the incident laser beam, and said second mirror acts to reflect the beam reflected from the first mirror in the same direction as the incident beam;

a focusing lens interposed in said optical path between said laser and said substrate surface, rotating means for rotating the optical assembly about the axis of the incident laser-beam, effective to generate a series of phototextured spots about the axis of the incident laser beam on the surface of said substrate, and shifting means for shifting the first mirror with respect to the second mirror along the axis of the incident laser beam, effective to change the radial distance of said spot from the substrate's central opening.

2. The apparatus of claim 1, wherein said substrate support is adapted to hold said substrate such that said planar surface is normal to said laser beam, and said beam is substantially coincident with a central axis defined by said central opening.

3. The apparatus of claim 1, which further includes control means effective to control the pulse frequency of said laser and said rotating and shifting means to produce a desired pattern and density of textured spots in a selected annular region of a support-held substrate.

4. The apparatus of claim 1, wherein said lens is interposed between said laser and the first mirror of said optical assembly.

5. The apparatus of claim 1, wherein said shifting means is effective to maintain a constant-length path of said laser beam between said lens and the surface of said substrate.

6. An apparatus for laser texturing an annular surface region of a magnetic disk substrate, said substrate having an annular planar surface extending between a central opening and an outer edge, said apparatus comprising a laser for generating a pulsed laser beam having a given frequency and a pulsed energy effective to phototexture the surface of the substrate, when the laser beam is focused onto the substrate surface, a substrate support adapted to hold the substrate at a selected position, an optical assembly, comprising first and second mirrors, effective to direct the laser beam onto a focused spot on the surface of said substrate adjacent said central opening, with the substrate held in said support, wherein said mirrors have planar reflecting surfaces orthogonally disposed with respect to one another, positioned to deflect the laser beam along an optical path that is substantially parallel to, but radially offset from, the axis of the incident laser beam, and said second mirror acts to reflect the beam reflected from the first mirror in a direction opposite that of the incident laser beam, a focusing lens interposed in said optical path between said laser and said substrate surface, rotating means for rotating the optical assembly about the axis of the incident laser beam, effective to generate a series of phototextured spots about the axis of the incident laser-beam on the surface of said substrate, and shifting means for shifting at least one mirror of said optical assembly with respect to the disk substrate, effective to change the radial distance of said spot from the substrate's central opening.

7. The apparatus of claim 6, wherein said second mirror is held at a fixed distance from said first mirror, and said shifting means is effective to shift the optical assembly along an axis that is normal to that of the incident laser beam.

8. The apparatus of claim 6, wherein said second mirror is movable with respect to said first mirror, such that said shifting means is effective to shift the second mirror along an axis that is normal to that of the incident laser beam.

9. A method for laser texturing an annular surface region of a magnetic disk substrate, said substrate having an annular planar surface extending between a central opening and an outer edge, comprising holding said substrate in a substrate support at a selected position, directing a pulsed laser beam, having a given frequency and a pulsed energy effective to phototexture the surface of the substrate, towards an optical assembly comprising first and second mirrors, which is effective to direct the beam onto a focused spot on the surface of said substrate, wherein said mirrors have confronting planar reflecting surfaces that are disposed plane-parallel with respect to each other, positioned to deflect the laser beam along an optical path that is substantially parallel to, but radially offset from, the axis of the incident laser beam, and said second mirror acts to reflect the beam reflected from the first mirror in the same direction as the incident laser beam, rotating the optical assembly about the axis of the incident laser beam, effective to generate a series of phototextured spots on the surface of said substrate, and shifting at least one mirror of said optical assembly along the axis of the incident laser beam, effective to change the radial distance of said spot from the substrate's central opening.

10. The method of claim 9, further comprising controlling said rotating and shifting means and the pulse frequency of said laser, to produce a desired density of texture spots in a selected annular region of a support-held substrate.

11. A method for laser texturing an annular surface region of a magnetic disk substrate, said substrate having an annular planar surface extending between a central opening and an outer edge, comprising holding said substrate in a substrate support at a selected position, directing a pulsed laser beam, having a given frequency and a pulsed energy effective to phototexture the surface of the substrate, towards an optical assembly comprising first and second mirrors, which is effective to direct the beam onto a focused spot on the surface of said substrate, wherein said mirrors have planar reflecting surfaces orthogonally disposed with respect to one another, positioned to deflect the laser beam along an optical path that is substantially parallel to, but radially offset from, the axis of the incident laser beam, and said second mirror acts to reflect the beam reflected from the first mirror in a direction opposite that of the incident laser beam, rotating the optical assembly about the axis of the incident laser beam, effective to generate a series of phototextured spots on the surface of said substrate, and shifting at least one mirror of said optical assembly with respect to the disk substrate, effective to change the radial distance of said spot from the substrate's central opening.

12. The method of claim 11, further comprising controlling said rotating and shifting means and the pulse frequency of said laser, to produce a desired density of texture spots in a selected annular region of a support-held substrate.

* * * * *